United States Patent [19]
Nicholson

[11] Patent Number: 5,963,749
[45] Date of Patent: Oct. 5, 1999

[54] SELF-LEVELING INVERTIBLE CAMERA STABILIZER

[76] Inventor: Lynn Nicholson, 6250 W. Flamingo, Suite #60, Las Vegas, Nev. 89103

[21] Appl. No.: 09/020,963

[22] Filed: Feb. 9, 1998

[51] Int. Cl.[6] .................................................. G03B 17/24
[52] U.S. Cl. ............................................................ 396/421
[58] Field of Search .................................... 396/421, 420, 396/427, 428, 422

[56] References Cited

U.S. PATENT DOCUMENTS

| | | | |
|---|---|---|---|
| Re. 32,213 | 7/1986 | Brown | 352/243 |
| D. 329,449 | 9/1992 | Brown et al. | D16/243 |
| 1,709,387 | 4/1929 | Bradfield . | |
| 1,993,485 | 6/1935 | Paul | 95/86 |
| 2,746,369 | 5/1956 | Beard et al. | 95/86 |
| 2,873,645 | 2/1959 | Horton | 88/16 |
| 2,945,428 | 7/1960 | Dearborn | 95/86 |
| 3,044,346 | 7/1962 | Fieux | 88/16 |
| 3,273,484 | 9/1966 | Lapsley | 95/86 |
| 3,332,593 | 7/1967 | Fauser | 224/5 |
| 3,490,833 | 1/1970 | Gottschalk et al. | 352/72 |
| 3,591,250 | 7/1971 | Lexington et al. | 350/16 |
| 3,858,228 | 12/1974 | Mito | 354/293 |
| 3,881,803 | 5/1975 | Parker | 350/16 |
| 4,037,763 | 7/1977 | Turchen | 224/54 V |
| 4,044,364 | 8/1977 | Prinzo | 354/74 |
| 4,083,480 | 4/1978 | Lee et al. | 224/5 V |
| 4,155,621 | 5/1979 | Mead | 350/16 |
| 4,156,512 | 5/1979 | Brown | 248/56 |
| 4,158,488 | 6/1979 | Gottschalk et al. | 352/243 |
| 4,158,489 | 6/1979 | Gottschalk et al. | 352/243 |
| 4,158,490 | 6/1979 | Gottschalk et al. | 352/243 |
| 4,206,983 | 6/1980 | Nettman et al. | 352/243 |
| 4,208,028 | 6/1980 | Brown et al. | 224/185 |
| 4,290,684 | 9/1981 | Hines | 354/286 |
| 4,298,149 | 11/1981 | Gottschalk et al. | 224/201 |
| 4,394,075 | 7/1983 | Brown et al. | 352/243 |
| 4,437,753 | 3/1984 | Dunn | 354/293 |
| 4,474,439 | 10/1984 | Brown | 352/243 |
| 4,625,938 | 12/1986 | Brown | 248/550 |
| 4,685,649 | 8/1987 | McKay | 248/594 |
| 4,687,309 | 8/1987 | Breslau | 354/82 |
| 4,710,819 | 12/1987 | Brown | 358/229 |
| 4,713,697 | 12/1987 | Gotou et al. | 358/222 |
| 4,727,390 | 2/1988 | Brown | 354/82 |
| 4,780,739 | 10/1988 | Kawakami et al. | 354/430 |
| 4,946,272 | 8/1990 | Brown | 352/243 |
| 4,967,282 | 10/1990 | Malavasi | 358/229 |
| 4,976,387 | 12/1990 | Spianti | 224/262 |
| 4,991,758 | 2/1991 | Eanoff | 224/208 |
| 5,005,030 | 4/1991 | Wells | 354/82 |
| 5,098,182 | 3/1992 | Brown | 352/243 |
| 5,111,983 | 5/1992 | Simmons et al. | 224/258 |
| 5,122,908 | 6/1992 | Sporer | 359/557 |
| 5,128,701 | 7/1992 | Hampton | 354/82 |
| 5,184,521 | 2/1993 | Tyler | 74/5.34 |
| 5,229,798 | 7/1993 | Brown | 352/243 |
| 5,243,370 | 9/1993 | Slater | 352/243 |
| 5,253,071 | 10/1993 | MacKay | 358/222 |
| 5,253,832 | 10/1993 | Bolas et al. | 248/123.1 |
| 5,331,413 | 7/1994 | Diner | 348/159 |
| 5,332,136 | 7/1994 | Rudolph | 224/185 |
| 5,360,196 | 11/1994 | DiGuilio et al. | 248/576 |
| 5,579,071 | 11/1996 | Wetzel et al. | 396/428 |
| 5,617,762 | 4/1997 | Kirsch | 74/490.06 |
| 5,768,648 | 6/1998 | Skipp et al. | 396/428 |

*Primary Examiner*—David M. Gray
*Attorney, Agent, or Firm*—Jeffer, Mangels, Butler & Marmaro LLP

[57] ABSTRACT

A camera stabilization device includes an inner camera support having a roll axis about which the inner support rotates, and an outer support at least partially surrounding and rotatably engaging the inner support. The outer support includes a coupler that engages a camera support structure.

15 Claims, 10 Drawing Sheets

SELF-LEVELING INVERTIBLE CAMERA STABILIZER

FIELD OF THE INVENTION

The present invention relates to stabilizers for cameras and other similar devices. More specifically, the present invention relates to camera stabilization devices, in particular body-mounted camera stabilization devices that are designed to produce smooth moving shots over all types of terrain.

BACKGROUND OF THE INVENTION

Body-mounted camera stabilization devices are comprised of a camera equipment support structure gimbaled at its center of gravity, where it is attached to a support arm, that is in turn attached to an operator worn vest. These devices are designed to isolate a camera or similar device from the unwanted movements of a walking, running, or otherwise moving operator or operator/vehicle combination. Such stabilization devices have been used successfully and extensively for over 20 years in the motion picture and video industries, and are most commonly known as Steadicams®. Exemplary stabilization devices are disclosed in U.S. Pat. Nos. Re. 32,213; 4,156,512; 4,474,439; 4,208,028; 4,394,075; and 5,579,071. Support arms are further described in U.S. Pat. Nos. 4,208,028 and 4,394,075. Each of the foregoing patents is incorporated herein in its entirety by reference.

Body-mounted camera stabilizers typically consist of a camera support structure that is attached at its center of gravity, via a 3-axis gimbal, to a support arm, and finally to an operator's vest, thus providing the desired degree of isolation from the operator. The camera support structure is approximately neutrally counterbalanced by a rigidly mounted camera at one end of a central post, and other rigidly mounted components (video monitor, battery, electronics, etc.), at the other end of the post. The camera can thus be aimed in any direction by slight hand pressure adjacent to the gimbal. The direction of these aiming motions are distinctly referred to as pan, tilt, and roll.

As defined in the art and as used herein, "roll" denotes rotation about an axis parallel to the camera's lens. "Tilt" describes rotation about a horizontal axis that is offset 90' from the lens axis. "Pan" describes rotation about an axis that runs down the center of the camera support central post.

Heretofore, incremental improvements have been made to camera stabilization devices in the areas of set-up time, the convenience of no-tools adjustability, improved dynamic balance adjustability, and even non-invasive/on-the-fly remote control of camera trim via an automated X-Y stage. However, these devices still have several operating problems relating to their inherent structure.

Since the camera and monitor are rigidly attached to the support structure, vertical camera travel, while maintaining a level camera horizon, is restricted to roughly 28 inches in standard mode, and another 28 inches in low mode. Low mode, however, requires mechanically removing the camera and reattaching it to the now inverted support structure via a special low mode bracket that is different for every camera. Additionally, the monitor must be inverted, the central post adjusted, the gimbal adjusted, a special gimbal/arm attachment bracket used, and all cables of the entire camera system must be detached and reattached. Finally, the system must be rebalanced. This time-intensive procedure must be followed every time the conversion from low to high or high to low is required. Often times, due to time constraints, the shot is eliminated, much to the chagrin of the director.

Another problem for operators of these devices relates to maintaining a level horizon, and/or correct framing relative to vertical objects in the shot. Neutral balance of these camera devices eliminates most of the unwanted forces of lateral and straight line acceleration, and allows superior isolation from the operator. However, neutral balance is seldom used because it provides little tendency for the camera system to remain level in the troublesome roll axis; attention would have to be diverted from the shot content in order to keep the camera level. Consequently, the camera support structure is set up slightly bottom-heavy (so that it weakly seeks level), and the operator is forced to deal with pendular consequences (during acceleration and deceleration) and their associated departures from level, pending the degree of bottom-heaviness and shot requirements. The operator still must focus a great deal of attention toward roll axis stability.

Additional problems arise when the shot requires clearing some type of obstacle, such as a car hood, fence, bar, desk, etc. To maintain camera level, the lower part of the support structure must be directly below the camera. There is no provision, for example, for pulling back off of an actor's face on the far side of a table, since the support structure would hit the table. A longer lens must be used to reach the actor, and consequently, the continuation of the shot is less dramatic, since longer lenses slow the apparent motion away from or toward a subject. A shot through waist high bushes would be impossible for the same reasons.

A need exists for an improved apparatus for augmenting the capabilities of camera stabilizers, in particular body-mounted camera stabilizers.

A need also exists for an improvement in the continuous vertical range of motion of body-mounted camera stabilizing devices, with accompanying elimination of low-mode brackets, low-mode conversions, and the production time lost to these conversions. More particularly, a need exists for a device which actively assists the operator by providing at least an automatically leveled camera roll axis, and which allows the operator to choose camera "level" based on usual or unusual visual references, and to continually upgrade these choices.

There is also a need for a device which provides the operator with variable control of at least the camera roll axis for "Dutch" angles or continuous rolls, and which furthermore allows neutral balance operation of the entire camera support structure, thereby minimizing pendular anomalies.

There is further a need for a device which provides the operator with a continuously level monitor, but whose inclination may be independently controlled by the operator for unusual circumstances.

A need also exists for a device which provides the operator with infinitely variable post positioning, including completely horizontal, for clearing tables, bars, bushes, etc., while automatically maintaining camera and monitor level.

A need also exists for a device which operates to defeat/lock any or all of the automated systems, and thus permits selective replication of prior art functions.

SUMMARY OF PREFERRED EMBODIMENTS

In accordance with one aspect of the present invention, there is provided a camera stabilization device. The inventive device includes inner means for supporting a camera, the inner means having a roll axis about which the inner means rotates; outer means for supporting the camera, the outer means at least partially surrounding and rotatably engaging the inner means; and means for coupling the outer means to a camera support structure.

Preferably, the camera stabilization device further includes means for determining the roll rate of the inner means about the roll axis thereof, and means for controlling the roll rate of the inner means about the roll axis thereof, the inner means roll rate controlling means being responsive to the means for determining the roll rate.

In a first specific embodiment, the inner and outer means include nested L-shaped brackets, together with a motor (preferably affixed to the outer means) for controlling the roll rate of the inner means and transmission means coupled to the motor for driving the inner means.

In a second specific embodiment, the inner and outer means include hoop brackets, together with a motor (preferably affixed to the outer means) and transmission means coupled to the motor for driving the inner means.

Preferably, the means for controlling the roll rate of the inner means includes a digital control processor.

In accordance with another aspect of the present invention, there is provided a camera stabilization device that includes the inner and outer means described above; a camera support structure; and means for coupling the outer means to the camera support structure.

In preferred embodiments, the camera support structure is a body-mounted camera stabilization device, a motorized vehicle (e.g., an automobile, an aircraft such as a helicopter, a boat, etc.), a non-motorized mobile apparatus (e.g., a dolly) or an immobile apparatus. Body-mounted camera stabilization devices, such as Steadicams®, that include a central post having a pan axis are particularly preferred.

In a more specific preferred embodiment, the camera support structure is a body-mounted stabilization device having a central post with a pan axis, and the outer means are coupled to the central post by the means for coupling such that the pan axis of the central post is perpendicular to the roll axis of the inner means.

Particularly preferably, the inventive device further includes a video monitor that displays an image viewed by a camera. The video monitor has a roll axis, and is rotatably coupled to the central post such that the pan axis of the central post is perpendicular to the roll axis of the video monitor.

In accordance with a further aspect of the present invention, stabilized cameras including the inventive stabilization device are provided.

The inventive stabilization device can readily be employed with objects other than cameras in order to provide stabilization to such devices.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

The present invention can be used to support any object that has a roll axis about which rotation is desired to be controlled selectably. The present invention is particularly useful with objects such as cameras. The invention can be employed with a wide range of known supporting devices for cameras and other objects, and is particularly applicable to body-mounted camera stabilizers, such as, but not limited to, the Steadicam®. Other camera mount applications include motorized vehicles such as automobiles, trucks, aircraft such as airplanes, helicopters and blimps, boats, and the like, non-motorized mobile apparatus such as wheeled tripods and dollies, immobile apparatus, in particular those having movable elements, such as non-wheeled tripods, cranes and boom arms, and the like, and in general in applications in which at least the roll axis requires stabilization or control, or the camera support structure of the particular application requires partial or complete inversion. Embodiments of the apparatus can also be hand-held, in which case the means for coupling the outer means to the camera support structure, i.e., the operator's hand, is a hand grip or other structure capable of being held by the operator.

Telescopes, lasers, sighting devices, seating devices, etc., are non-limiting examples of non-camera applications.

By controlling the roll rate of the inner means about its roll axis, the present invention allows the operator to maintain a fixed angle of the camera with respect to the horizon.

The present invention also allows the use of a video monitor that rolls about its roll axis at a controllable rate. This permits the operator to view the image viewed by camera, for example, at the same angle. Such embodiments are particularly beneficial when employed with a camera support structure having a component that is capable of rotation, e.g., the central post of a Steadicam®, an aircraft, etc.

Figure 10:
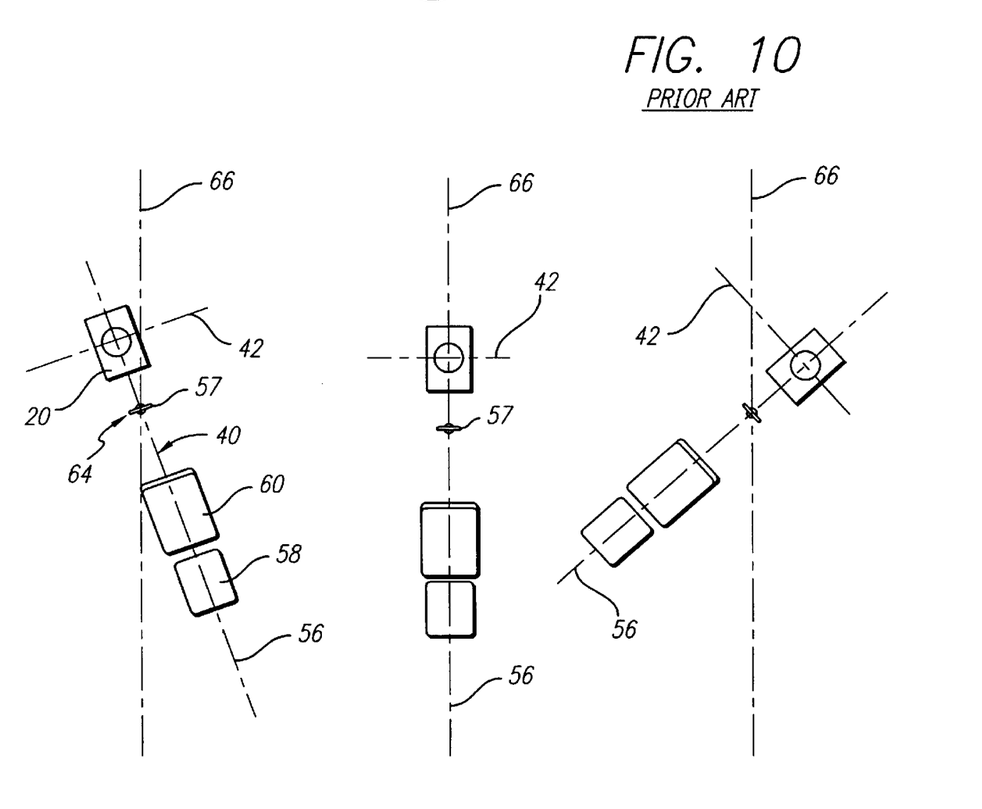
FIG. 10 shows a time lapsed sequence front view of the prior art being inverted, while the camera and monitor remain rigidly attached to the central post.

Body-mounted camera stabilizers generally include rigidly connected cameras and peripheral gear (lens, lens controls, magazines, etc.) located atop a central post, and other equipment such as batteries, video monitor, electronics and accessories rigidly attached at the other end of the same post. A 3-axis gimbal is adjustably attached to the central post approximately at the point that is coincident with the center of gravity of the entire camera equipment support. In operation, it is preferred that the equipment be in dynamic balance, so that there is no precession when spun around the pan axis. FIG. 10 shows a front view of this prior art device being rotated in its roll axis via time lapse. Note how the camera 20 and video monitor 60 do not remain level, except when the camera support structure central post 62 is absolutely vertical 66.

The present invention is directed to means for separating the inclination of the object(s), such as a camera and monitor, from the support structure, in each of their respective roll axes, while providing automated leveling of the object(s). With reference to body-mounted camera supporting devices in particular, the camera mass and monitor mass are gimbaled to the camera support structure central post (in their respective roll axes), rather than attached rigidly to it. This allows independent continuous automatic leveling of the camera and monitor while the entire structure is inverted or otherwise not absolutely vertical. Also, the operator may choose vertical post operation, while separately adjusting the inclination of the camera, in either a fixed auto-leveled "Dutch" angle, or a continuous roll. The inclination of the monitor may also be separately adjusted for a more convenient viewing angle, or other reasons.

The prior art has rigidly attached components, and therefore needs to be operated in the vertical position for level shots, or rotated in its entirety for "Dutch" angles or continuous rolls. Also in the prior art, when the entire support structure is rolled for these purposes, the central post gimbal becomes the pivot point, not the roll axis of the camera, and further complications arise.

In the present invention, the operator is actively assisted by a sensor controlled computer for maintaining at least a level or chosen camera horizon. The operator is free to concentrate more fully on the framing of the shot, rather than dealing with a passive system, as in the prior art, that requires constant roll axis vigilance. The operator may place the support structure out of the way, while placing the auto-leveled camera precisely where needed, rather than have the support structure constantly in the way, or the camera at a useless inclination, as in the prior art.

In the present invention, the operator may take the camera from low to high, high to low, or anywhere in between, instantly and continuously, rather than mechanically converting the camera support structure from high to low or low to high, as in the prior art. In the present invention, the camera remains mounted to the system at the camera base plate, and all cables remain attached, eliminating the time, cost, and confusion associated with the low mode brackets, low mode conversions, and cable reconfiguration of the prior art.

Since at least the roll axis is automatically leveled, neutral balance operation is possible, and minimizes unwanted pendular effects caused by variable acceleration/deceleration. The prior art requires a certain amount of bottom-heaviness, and is therefore pendular, and troublesome.

Figure 1:
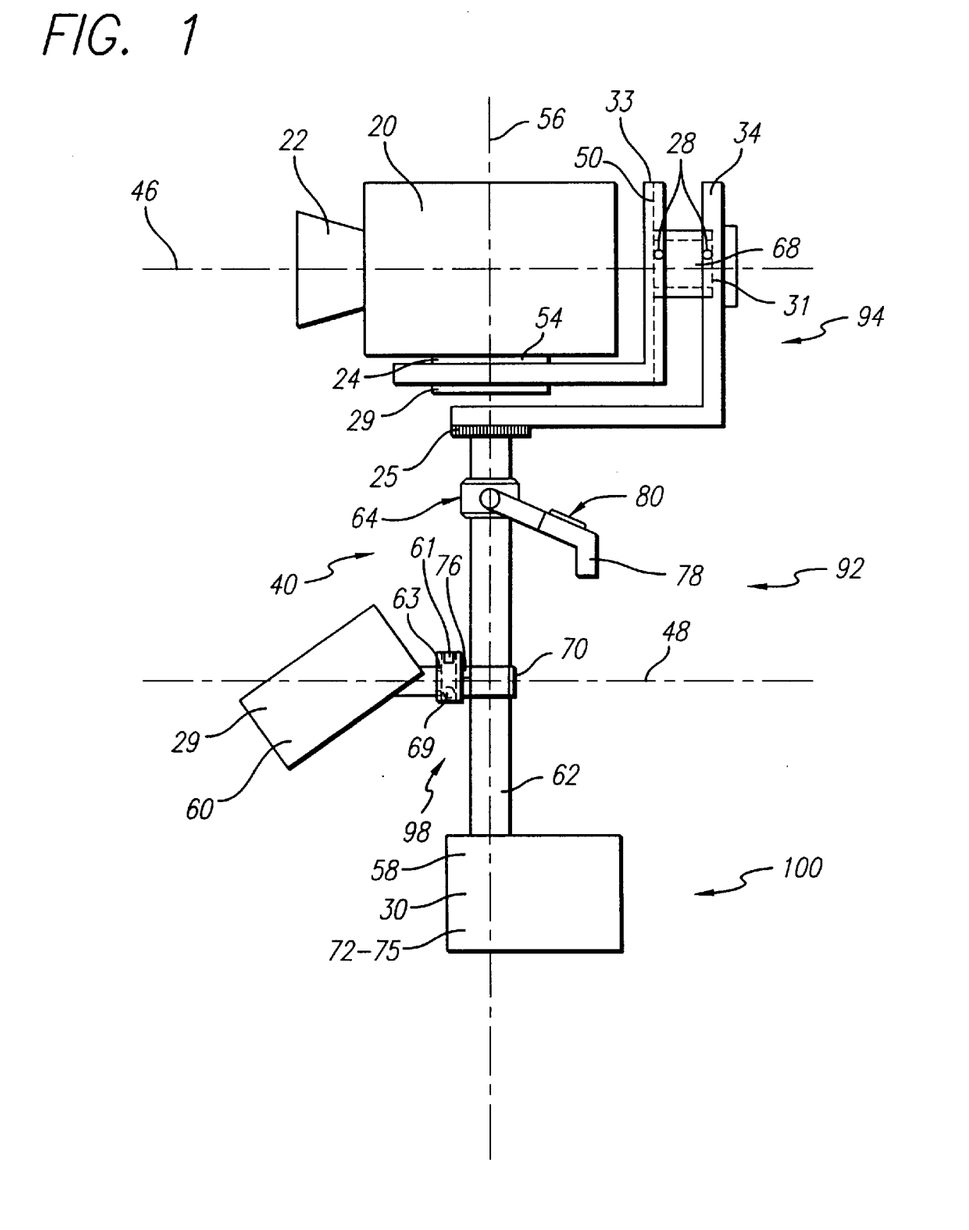
FIG. 1 shows a side view of a first preferred embodiment of a stabilization device produced in accordance with the present invention.
Figure 2:
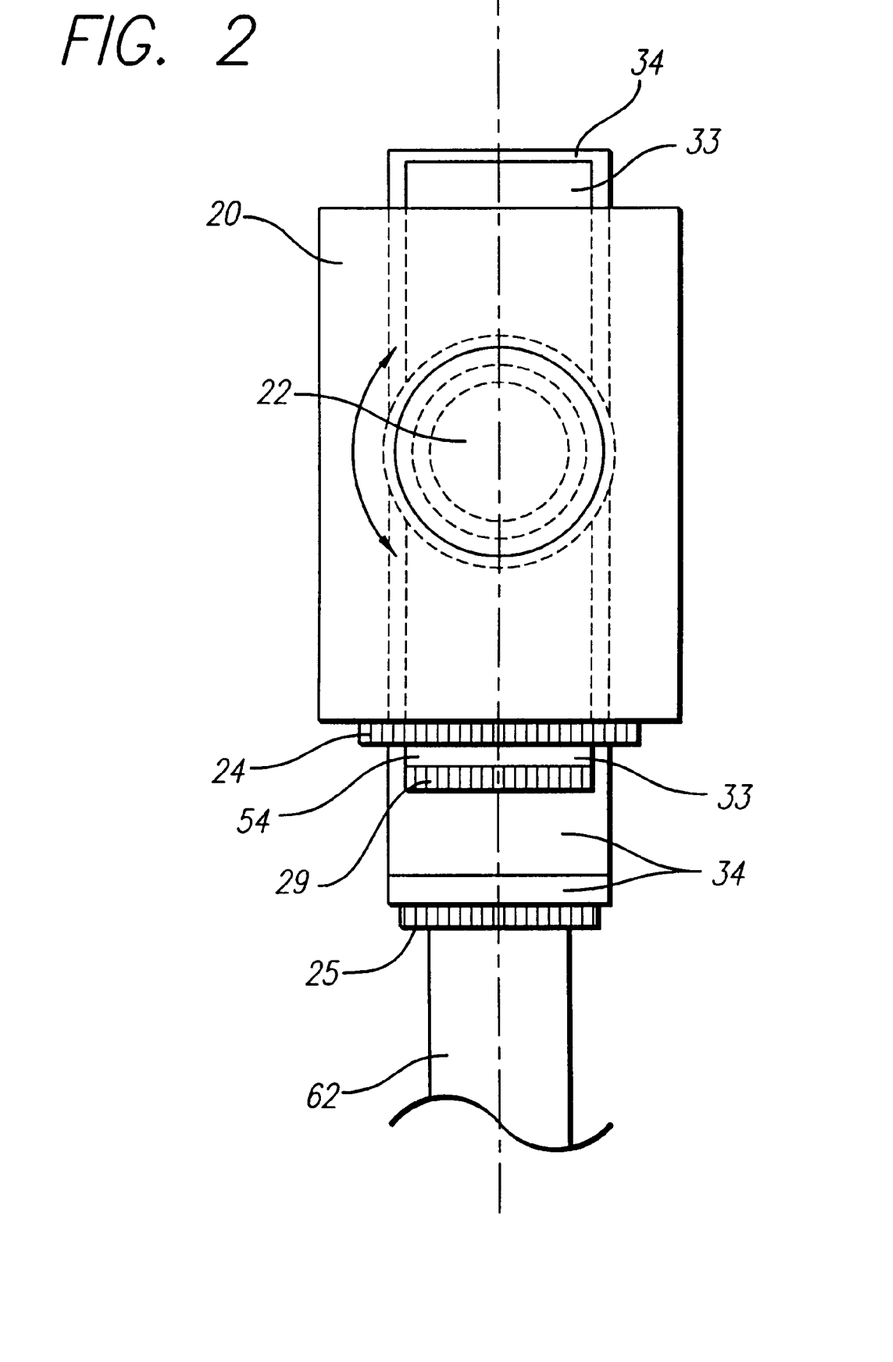
FIG. 2 shows an enlarged front view of the camera gimbal of FIG. 1.
Figure 3:
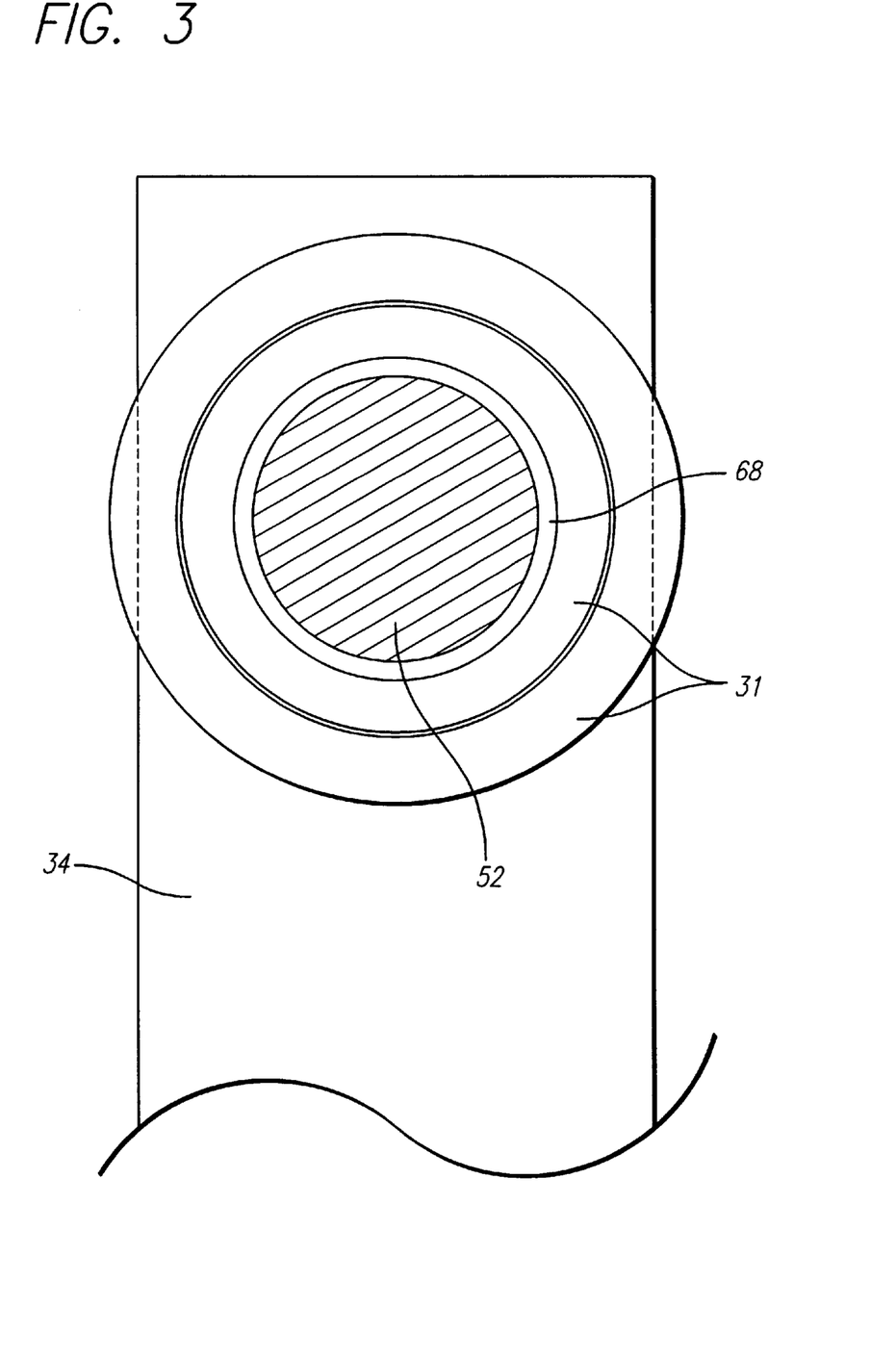
FIG. 3 shows an enlarged back view of the bearing/motor assembly of FIG. 1.

FIG. 1 shows a first preferred embodiment of a stabilization device of the present invention, illustrating its various components. Self-leveling invertible camera stabilizing support 92 includes double "L" bracket camera gimbal 94 located atop outer "L" bracket X-Y stage 25 (manual or motorized), that is in turn located atop camera support structure central post 62. FIG. 2 shows an enlarged front view of the same embodiment. FIG. 3 shows an enlarged back view of the double "L" bracket camera gimbal motor 31 area.

Video monitor gimbal assembly 98 is located between video monitor 60 and camera stabilizing support 40. Control electronics modules 100 are located at the bottom of camera stabilizing support 40 in this embodiment, but can be placed elsewhere if desired in this embodiment and in embodiments other than body-mounted devices. Operator remote control 80 is located atop gimbal handle 78.

The double "L" bracket camera gimbal 94 is comprised of inner "L" bracket 33 and outer "L" bracket 34, connected together via bearings 28 and drive shaft 68, such that camera 20 may rotate about roll axis 46, while remaining perpendicular to camera support structure central post 62. Vertical adjustment of camera 20 to achieve the preferred neutral balance of roll axis 46 is by dovetail/leadscrew combination 50 for the illustrated flat plate "L" brackets, or by a tubing/collar combination for double tube "L" brackets (see FIG. 11, elements 102, 104, 106).

Camera fore and aft, and side to side adjustments, are provided by a manual or motorized X-Y stage 24, consistent with the present state of the art. Preferably also provided is a conventional quick release/pivot (not shown) to attach said camera 20, at its base, to said X-Y stage 24, thus allowing convenient removal and attachment of rear vertical film magazines 44.

Figure 11:
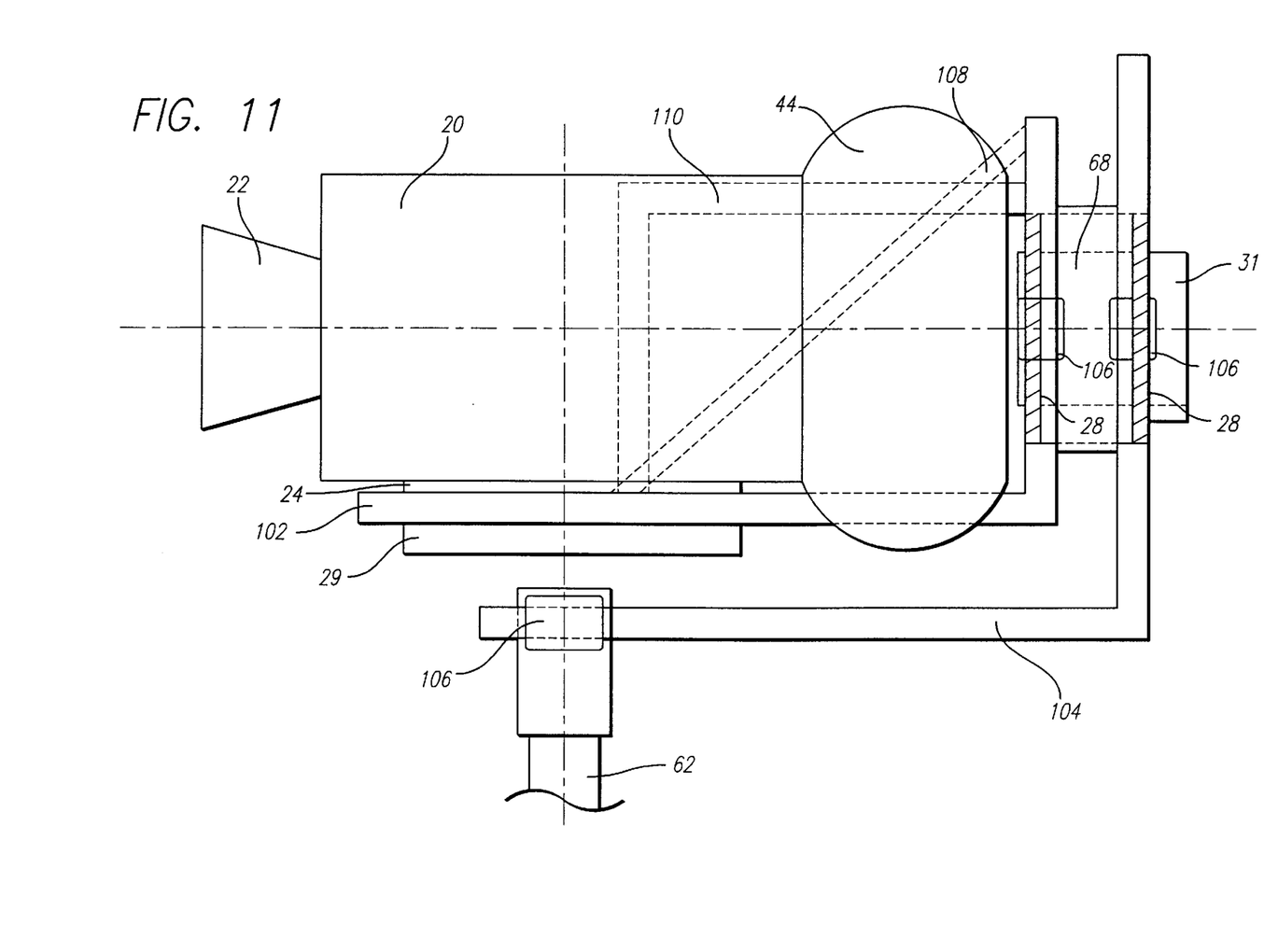
FIG. 11 shows an enlarged side view of the camera gimbal of a third preferred embodiment of a stabilization device produced in accordance with the present invention.

Vertical positioning for rotational clearance of the camera 20/inner "L" bracket 33 within the outer "L" bracket 34, is provided by a conventional dovetail/leadscrew combination (not shown) for flat plate "L" brackets, or by tubing/collar combination (also not shown) for double tube "L" brackets. FIG. 11 also shows an inner "L" bracket diagonal strut 108 and an inner "L" bracket right angle strut 110 as optional structural means to clear the vertical film magazine 44 removal.

Double "L" bracket camera gimbal motor 31 (or similar device), attaches to the vertical portion 34*a* of outer "L" bracket 34, and provides rotational energy to drive shaft 68, thus turning inner "L" bracket 33 and attached camera 20.

Inertial rate sensors 29 and their associated conditioning electronics are attached to inner "L" bracket 33, in their respective X, Y, and Z axes, i.e., at right angles to each other (not shown), thus providing rotational rate feedback signals that measure the motion of the camera 20 in its respective roll, pan and tilt axes. A camera position sensor 77 (shown schematically in FIG. 7) or similar device, is attached by conventional means, between inner "L" bracket 33 and outer "L" bracket 34, thus providing angle position feedback signals that measure the roll axis position of camera 20, relative to the camera stabilizing support 40. The roll axes of the camera 20 and the video monitor 60 are always perpendicular to the pan axis of central post 62 and are preferably coplanar with each other and with the pan axis of central post 62.

Further, video monitor 60 rotates on its roll axis center of gravity 48 via bearings 63 and drive shaft 69. A smaller motor 61 attaches to camera stabilizing support 40 via mounting collar 70 and provides rotational energy to drive shaft 69, thus turning the video monitor 60. Monitor position sensor 76 is attached by conventional means between camera stabilizing support 40 and video monitor 60, thus providing angle position feedback signals that measure the roll axis position of the video monitor 60, relative to the camera stabilizing support 40. Inertial rate sensor(s) 29 and associated signal conditioning electronics 116 (shown only in FIG. 7), are optionally also attached to monitor 60 in a manner similar to that described previously for the camera 20, thus providing rotational rate feedback signals that measure the motion of the video monitor 60 in its respective roll, pan and tilt axes.

Inertial rate sensors 29 can optionally be mounted on the camera stabilizing support 40 in, on or near the control electronics module 100, with appropriate modification of the control calculations/algorithms and logic functions performed by digital control processor 30.

Figure 7:
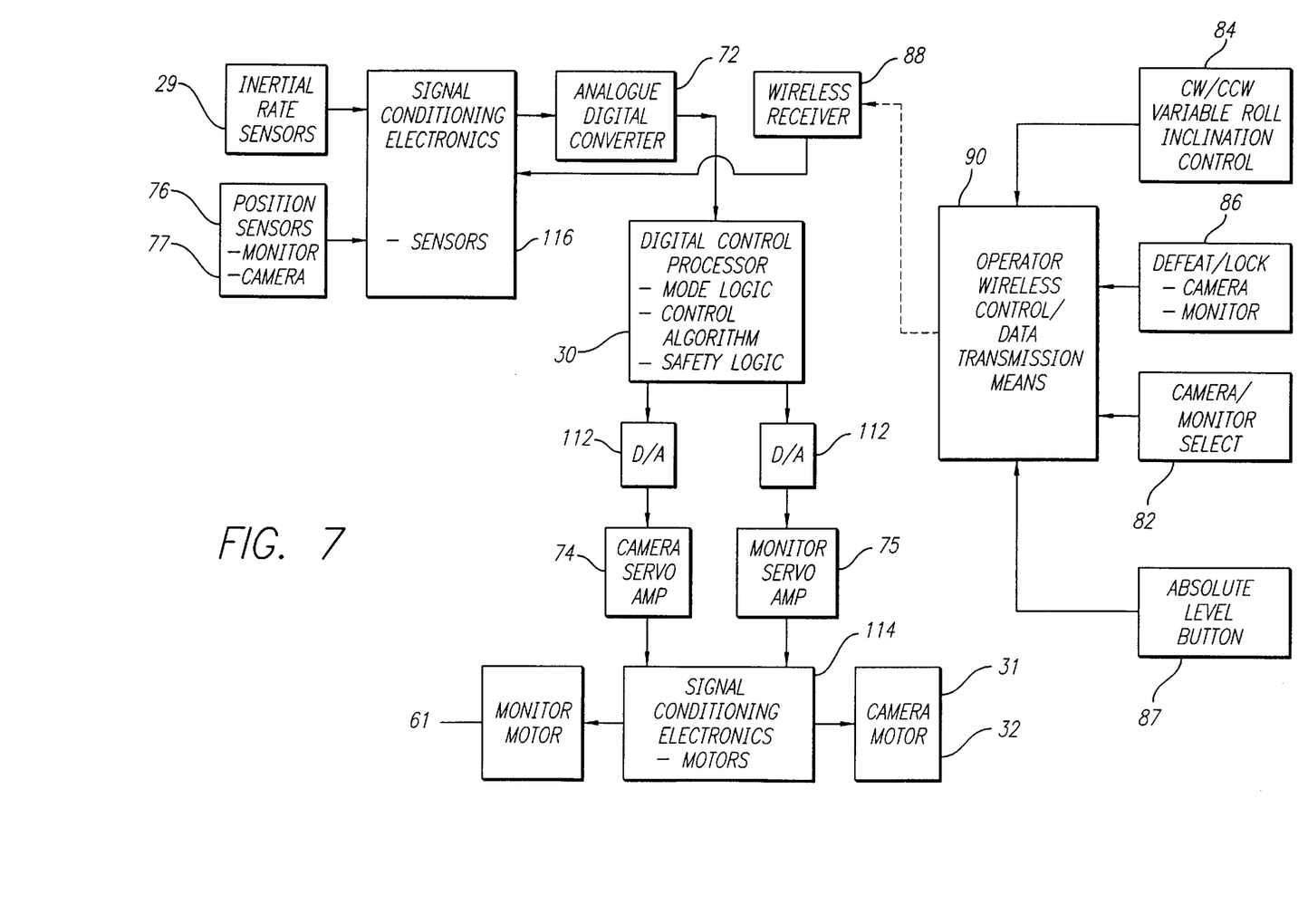
FIG. 7 shows a block diagram of the camera and monitor control system.

Inertial rate sensors 29 or similar sensors and signal conditioning electronics 116 provide precise rate feedback signals via analog to digital convertors 72 to a digital control processor 30. Video monitor 60 is provided with position sensor(s) 76 indicating the inclination of the video monitor, relative to camera support structure central post 62. This positioning data is also sent to the same digital control processor 30 via analog to digital convertors 72.

The positioning data is processed by digital control processor 30, which provides command signals via digital to analog converters 112 to servo amps 74, 75 that in turn control direct drive DC torque motors 31, 61 that position both camera 20 and video monitor 60. Signal conditioning electronics 114 are used to improve the quality of the command signal from the servo amps 74, 75 to the motors 61 and 31 or 32. Thus, no matter what the inclination of central post 62, camera 20 and video monitor 60 remain level in at least their respective roll axes. Further, the operator may re-calibrate visual camera level as often as necessary, based on shot requirements, via operator remote control 80 or similar device located atop gimbal handle 78.

Figure 6:
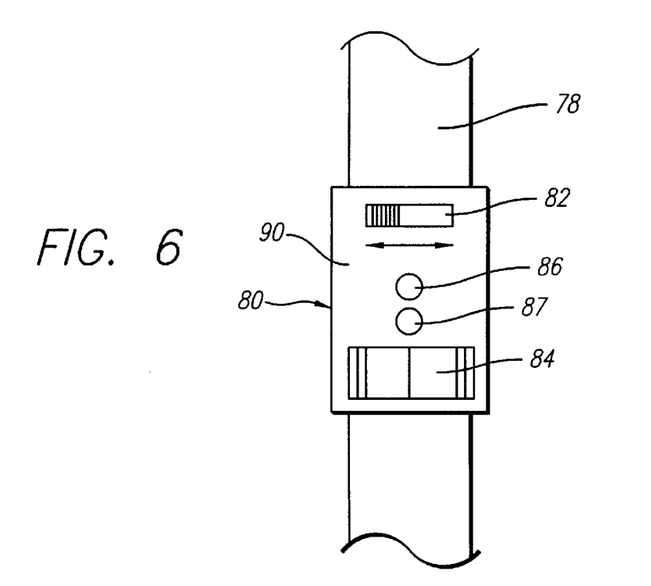
FIG. 6 shows an enlargement of a gimbal handle operator control means.

FIG. 6 shows an enlarged view of a preferred embodiment operator remote control 80, to independently control the inclination of camera 20 and video monitor 60 for unusual circumstances including, but not limited to "Dutch" angles or continuous rolls for camera 20, or more convenient viewing angles for video monitor 60. The operator preferably is provided with camera control/monitor control select switch 82 (command switch), defeat/lock button(s) 86 (command switch), absolute level button 87 (command switch), and clockwise/counterclockwise variable roll/inclination control potentiometer(s) 84 (command sensor). Other similar devices for carrying out the foregoing functions can be employed if desired.

Defeat/lock button 86 allows the operator to lock one or both of camera 20 and monitor 60 (i.e., to selectively deactivate the automated leveling function for the camera and/or the monitor, depending on the position of select switch 82), and thus to have camera stabilizing support 40 function in a manner similar to the prior art. Clockwise/counterclockwise variable roll/inclination control 84 allows the operator to roll camera 20 continuously, or select "level", based on visual references in the shot. The absolute level button 87 allows the operator to instantly re-establish camera absolute roll axis level at any time. The absolute leveling function is effected by transmission of a signal to digital control processor 30 to restore the camera orientation to an absolute horizontal setting. The absolute horizontal setting preferably is determined and stored at the time of an initial calibration of the inertial sensors. Such initial calibration is a routine procedure when inertial sensors are employed in stabilization devices.

The control potentiometers 84 and defeat/lock buttons 86 can be linked directly to digital control processor 30, or can be linked via an operator wireless transmitter control 90 and wireless receiver 88 (see FIG. 7).

The control system (FIG. 7) includes three types of components: sensors and associated electronics, a digital control processor, and motors and associated electronics.

Sensors and their associated electronics include command sensors, rate sensors, position sensors, sensor signal conditioning electronics and analog-to-digital converters. Command sensors, such as potentiometers 84 and similar devices, allow the operator to input a rate command to the control system. The rate command drives the camera control loop to cause the camera motor to rotate the camera at the desired angular rate, or in an alternative embodiment to the desired angular position. It may also be used by the operator to command an offset from level to the control system, causing the camera motor to roll the camera to an off-level position ("Dutch angle"). In position mode, the signal from the potentiometer 84 drives the camera control loop to cause the motor to rotate the camera to the desired angular position.

Rate sensors, preferably inertial rate sensors, are used to measure the rotational motion of the camera package in the roll, pan and tilt axes. These sensors feed the camera control loop to maintain the camera and monitor level with the horizon, or to maintain the camera/monitor at an off-level angle with the horizon, based on an operator command input to the control loop via the command sensor.

Position sensors provide position feedback signals to the control loop in order to maintain the camera and video monitor in the proper angular relationship with the horizon.

Sensor signal conditioning electronics preferably include an analog circuit to provide conditioned supply voltage to the sensors and to filter and optionally amplify the analog sensor output signal prior to being digitized by the analog-to-digital converter.

The analog-to-digital converter converts each of the conditioned analog sensor outputs to a digital format for processing by the digital control processor.

The signals provided by the previously described rate sensors, position sensors, command switches and command sensors are first at least filtered and amplified (if needed) by the conditioning electronics 116, and then converted from analog signals to digital signals by the analog-to-digital converters. Next, the digital control processor 30 receives the signals, as shown in FIG. 7, and generates motor drive signals that actuate the camera and video monitor motors 31 and 61, thus keeping the camera 20 and video monitor 60 at the desired inclinations.

The digital control processor 30 can be, for example, a known microprocessor. A non-limiting example of a useful processor is a Motorola HC-16 processor. Other processors can also be employed.

The drive signals are based on control calculations and logic functions performed by the processor. Mode logic functions determine when to calibrate the system, when to enable the servo-motors, and when to execute the control algorithms. These decisions are based on the status of mode switches set by the operator. Safety logic functions are executed as part of the control algorithm to keep the system from overdriving the camera or monitor motors, and consequently putting the operator or system equipment at risk.

The control calculations, computed by the control processor, generate the signals which drive the camera and monitor motors. Based on signals from the command, rate and position sensors, the control calculations consist of a series of cascaded digital filters which shape the drive signals to generate the desired system frequency response. Software for implementing the necessary calculations is readily prepared by those skilled in the art.

The motors and associated electronics include a digital-to-analog converter which converts the command signal, which is in digital format from the control processor, to an analog voltage. A servo-amplifier converts the output voltage signal from the digital-to-analog converter to a suitable current to drive the camera and monitor motors. Finally, motor signal conditioning electronics suppress high voltage/high frequency noise from the servo-amp output that may interfere with system or other subsystem operations.

Figure 8:
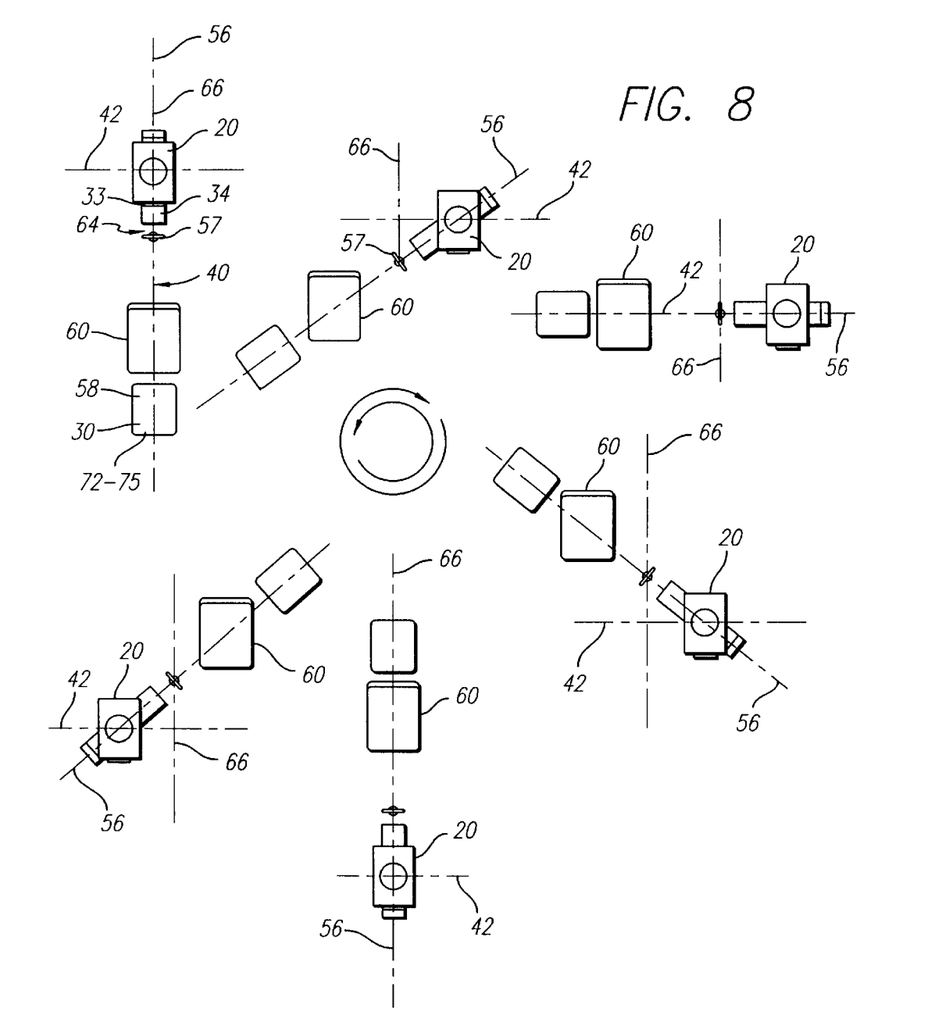
FIG. 8 shows a time lapsed sequence front view of the preferred embodiment of FIG. 1 being inverted, while the camera and monitor remain level.

FIG. 8 shows the present invention being inverted in this preferred embodiment, via time lapse. Note that monitor 60 and camera 20 remain level in at least their respective roll axes, despite the inclination of central post 62. Slip rings, RF(radio frequency)/infrared/inductive loops 52 or other similar means of data/power transmission are provided to allow infinite rotation of camera 20 and video monitor 60, and also for data transmission from operator remote control 80. Cables can also be employed, but may limit the rotational range of camera 20 and video monitor 60.

Figure 4:
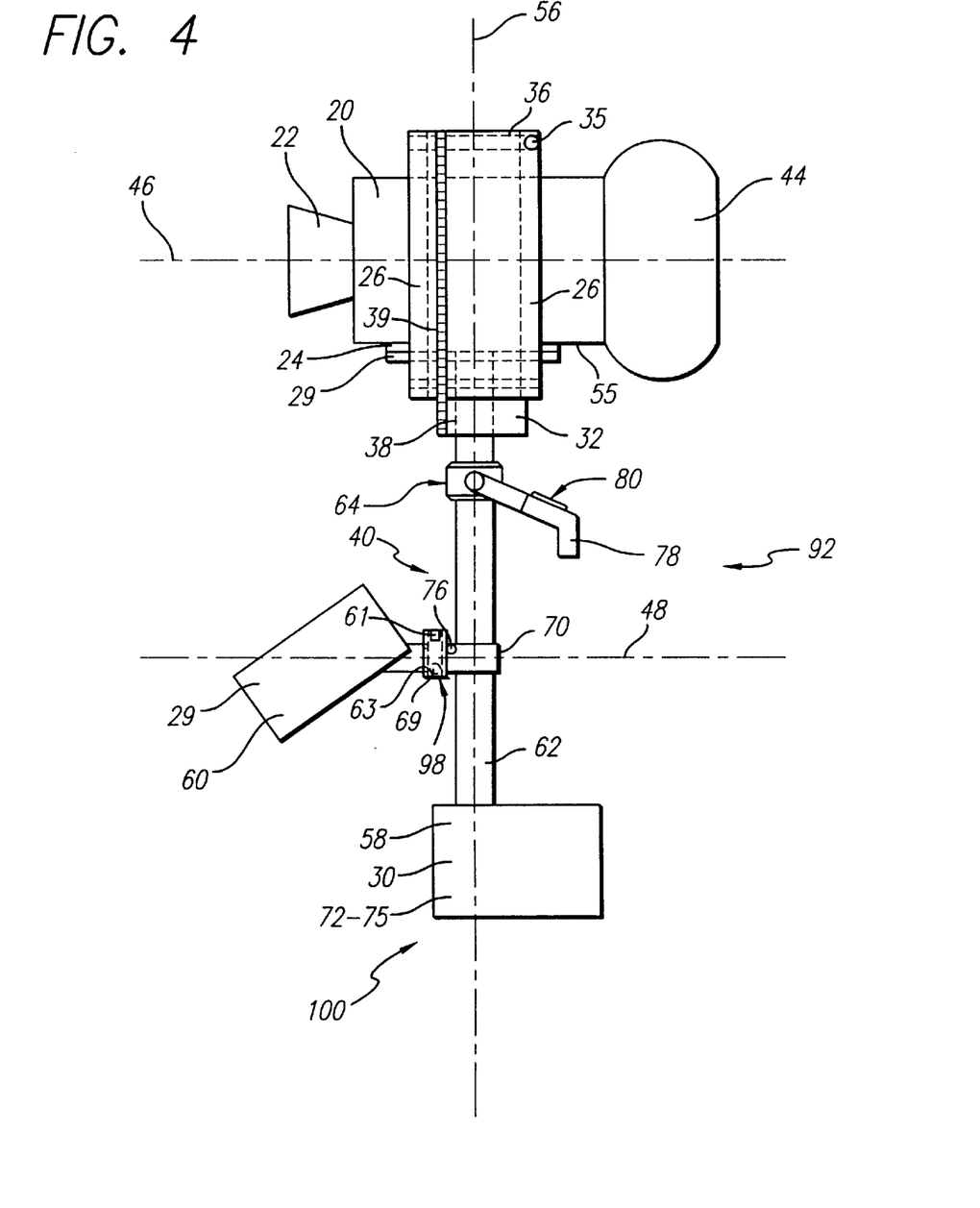
FIG. 4 shows a side view of a second preferred embodiment of a stabilization device produced in accordance with the present invention.
Figure 5:
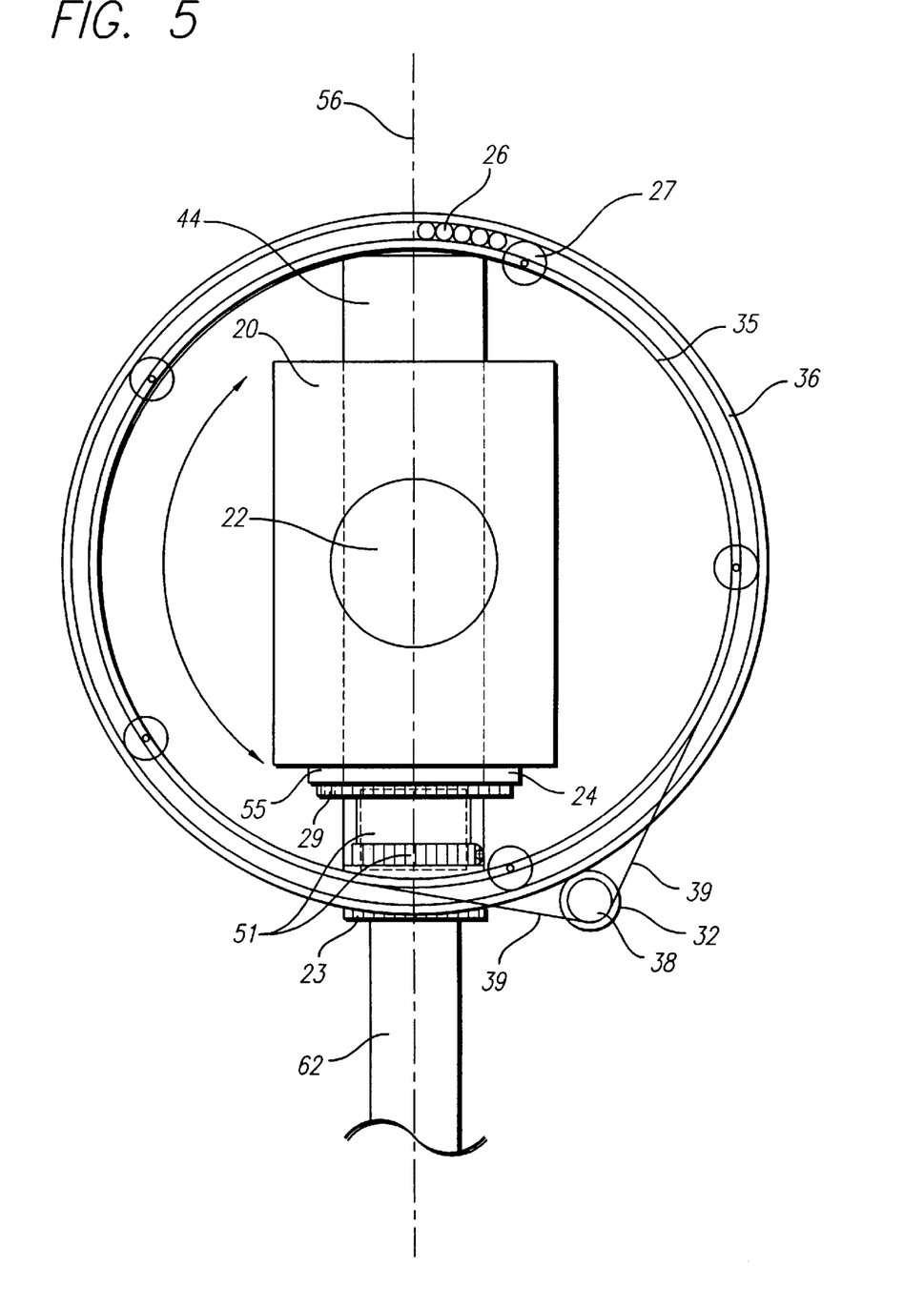
FIG. 5 shows an enlarged front view of the camera gimbal of FIG. 3.

FIGS. 4 and 5 show a second preferred embodiment. This embodiment is provided to accommodate (but is not limited to) film cameras with rear vertical magazines 44. The camera gimbal consists of at least two circular hoop brackets 35, 36, which can be concentric (as illustrated), or displaced with respect to one another along their common axis of rotataion. The circular hooops 35, 36 are separated by at least two precision bearing means 26. In an alternative embodiment, at least five larger integral bearings 27 or similar devices are employed to provide appropriate rigidity. The monitor gimbal and control means are unchanged from the preceding embodiment. Vertical adjustability of the camera preferably is provided by telescoping post/collar 51 or similar means.

Camera 20 is attached to inner hoop bracket 35 via an adjustable X-Y stage 24 that is consistent with conventional wisdom. The position of camera 20 is adjustable both side to side and fore and aft for proper neutral balance of its roll axis 46. A quick release/pivot 55 or similar device preferably is provided to access the film door of camera 20.

Figure 9:
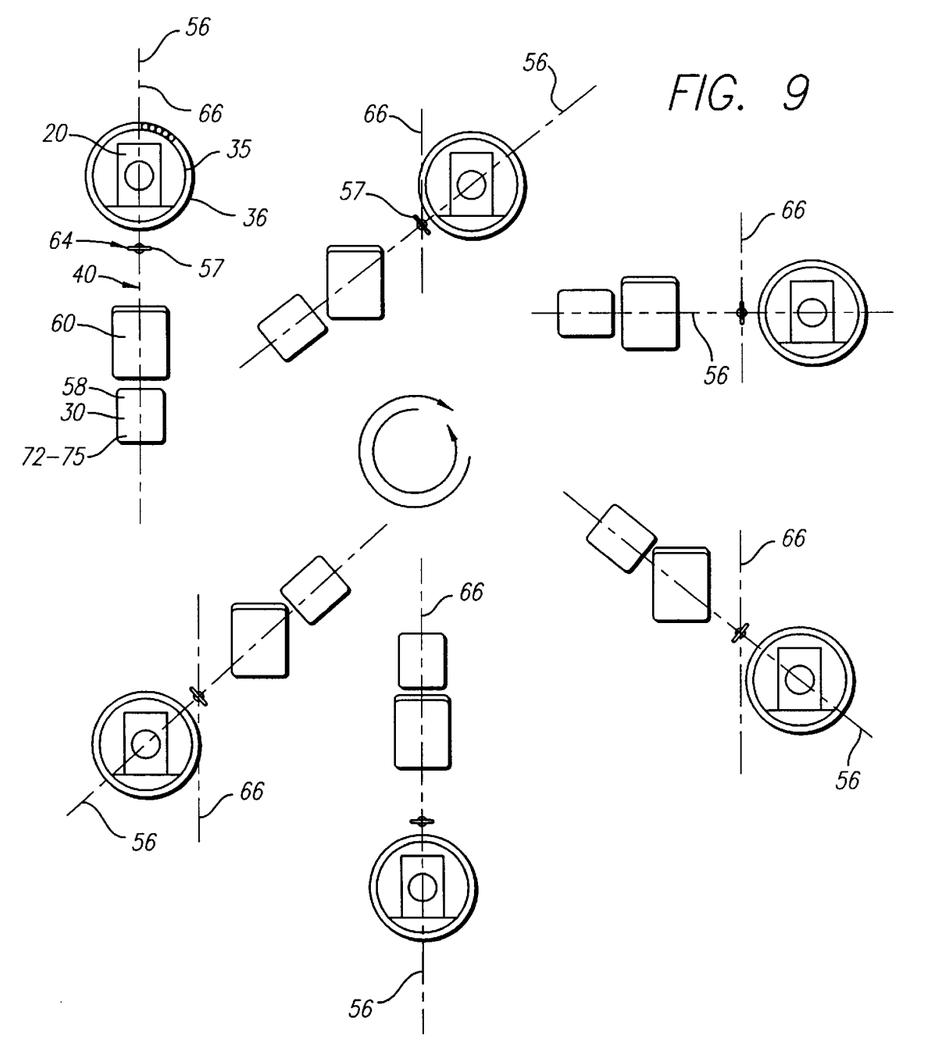
FIG. 9 shows a time lapsed sequence front view of the preferred embodiment of FIG. 4 being inverted, while the camera and monitor remain level.

Camera gimbal motor 32 (affixed as illustrated to outer hoop bracket 36) drives inner hoop bracket 35 by transmission means such as gear 38 in combination with gear/belt/chain 39 or similar means. Camera gimbal motor 32 can be affixed elsewhere if desired, such as to central post 62. Thus, no matter what the inclination of central post 62, camera 20 and monitor 60 remain level in at least their respective roll axes. Further, the operator may visually re-calibrate camera level as often as necessary, based on shot requirements, via operator remote control 80 as described previously. The operator may also select, by similar means, a continuous roll or "Dutch" angle for camera 20, while monitor 60 remains at the preferred "level" inclination. FIG. 9 illustrates inversion of this preferred embodiment of the present invention, via time-lapse. Note again control of the direct drive DC torque motors 31, 61 that position both camera 20 and video monitor 60. Thus, no matter what the inclination of central post 62, camera 20 and video monitor 60 remain level in at least their respective roll axes.

In all embodiments of the present invention, the automated leveling function can be deactivated and electronically or mechanically locked, allowing duplication of the functioning of the prior art devices if desired.

What is claimed is:

1. A camera stabilization device comprising:

inner means for supporting a camera, said inner means having a roll axis about which said inner means rotates;

outer means for supporting said camera, said outer means at least partially surrounding and rotatably engaging said inner means;

means for coupling said outer means to a camera support structure;

means for determining the roll rate of said inner means about said roll axis thereof;

means for controlling the roll rate of said inner means about said roll axis thereof, said means being responsive to said means for determining said roll rate; wherein said inner and outer means comprise hoop brackets, and wherein said means for controlling the roll rate of said inner means comprises a motor and transmission means coupled to said motor for driving said inner means;

wherein said motor is affixed to said outer means; and wherein said transmission means comprise a gear coupled to said motor and a chain which engages said gear and said inner means.

2. A camera stabilization device comprising:

inner means for supporting a camera, said inner means having a roll axis about which said inner means rotates;

outer means for supporting said camera, said outer means at least partially surrounding and rotatably engaging said inner means;

means for coupling said outer means to a camera support structure;

means for determining the roll rate of said inner means about said roll axis thereof;

means for controlling the roll rate of said inner means about said roll axis thereof, said means being responsive to said means for determining said roll rate; wherein said inner and outer means comprise hoop brackets, and wherein said means for controlling the roll rate of said inner means comprises a motor and transmission means coupled to said motor for driving said inner means;

wherein said motor is affixed to said outer means; and wherein said transmission means comprise a pulley coupled to said motor and a belt which engages said gear and said inner means.

3. A camera stabilization device comprising:

inner means for supporting a camera, said inner means having a roll axis about which said inner means rotates;

outer means for supporting said camera, said outer means at least partially surrounding and rotatable engaging said inner means;

a camera support structure;

means for coupling said outer means to said camera support structure;

means for determining the roll rate of said inner means about said roll axis thereof;

means for controlling the roll rate of said inner means about said roll axis thereof, said means being responsive to said means for determining said roll rate;

wherein said camera support structure is selected from the group consisting of a body-mounted camera stabilization device, a motorized vehicle, a non-motorized mobile apparatus and an immobile apparatus; and wherein said camera support structure is a body-mounted camera stabilization device that comprises a central post having a pan axis, and wherein said outer means are coupled to said camera support structure central post by said means for coupling such that said pan axis of said central post is perpendicular to said roll axis of said inner means.

4. The camera stabilization device of claim 3 wherein said inner and outer means comprise hoop brackets, said means for controlling the roll rate of said inner means comprises a motor and transmission means coupled to said motor for driving said inner means, and said motor is affixed to said outer means or to said central post.

5. A camera stabilization device comprising:

inner means for supporting a camera, said inner means having a roll axis about which said inner means rotates;

outer means for supporting said camera, said outer means at least partially surrounding and rotatably engaging said inner means;

a camera support structure;

means for coupling said outer means to said camera support structure;

means for determining the roll rate of said inner means about said roll axis thereof;

means for controlling the roll rate of said inner means about said roll axis thereof, said means being responsive to said means for determining said roll rate;

wherein said camera support structure is selected from the group consisting of a body-mounted camera stabilization device, a motorized vehicle, a non-motorized mobile apparatus and an immobile apparatus; and a video monitor that displays an image viewed by a camera, said video monitor having a roll axis, said video monitor being rotatably coupled to said support structure central post such that said pan axis of said central post is perpendicular to said roll axis of said video monitor.

6. The camera stabilization device of claim 5 further comprising means for determining the roll rate of said video monitor about said roll axis thereof, and means for controlling the roll rate of said video monitor about said roll axis thereof, said means being responsive to said means for determining said roll rate.

7. A camera stabilization device comprising:

inner means for supporting a camera, said inner means having a roll axis about which said inner means rotates;

outer means for supporting said camera, said outer means at least partially surrounding and rotatably engaging said inner means;

a camera support structure;

means for coupling said outer means to said camera support structure;

means for determining the roll rate of said inner means about said roll axis thereof; and means for controlling the roll rate of said inner means about said roll axis thereof, said means being responsive to said means for determining said roll rate;

wherein said inner and outer means comprise hoop brackets, and wherein said means for controlling the roll rate of said inner means comprises a motor and transmission means coupled to said motor for driving said inner means;

wherein said motor is affixed to said outer means; and wherein said transmission means comprise a gear coupled to said motor and a chain which engages said gear and said inner means.

8. A camera stabilization device comprising:

inner means for supporting a camera, said inner means having a roll axis about which said inner means rotates;

outer means for supporting said camera, said outer means at least partially surrounding and rotatably engaging said inner means;

a camera support structure;

means for coupling said outer means to said camera support structure;

means for determining the roll rate of said inner means about said roll axis thereof; and means for controlling the roll rate of said inner means about said roll axis thereof, said means being responsive to said means for determining said roll rate;

wherein said inner and outer means comprise hoop brackets, and wherein said means for controlling the roll rate of said inner means comprises a motor and transmission means coupled to said motor for driving said inner means;

wherein said motor is affixed to said outer means; and wherein said transmission means comprise a pulley coupled to said motor and a belt which engages said gear and said inner means.

9. A camera stabilization device comprising:

inner means for supporting a camera, said inner means having a roll axis about which said inner means rotates;

outer means for supporting said camera, said outer means at least partially surrounding and rotatably engaging said inner means;

means for determining the roll rate of said inner means about said roll axis thereof;

a video monitor that displays an image viewed by a camera, said video monitor having a roll axis, said video monitor being rotatably coupled to said support structure central post such that said pan axis of said central post is perpendicular to said roll axis of said video monitor;

means for determining the roll rate of said video monitor about said roll axis thereof;

means for controlling the roll rate of said inner means and said video monitor about the respective roll axes thereof, said means being responsive to said respective means for determining said roll rate of said inner means and of said video monitor about the respective roll axes thereof, said means comprising a digital control processor;

a body-mounted camera stabilization device comprising a central post having a pan axis; and means for coupling said outer means to said central post such that said pan axis of said central post is perpendicular to said roll axis of said inner means.

10. A stabilized camera comprising a camera and the camera stabilization device of claim 9.

11. A camera stabilization device comprising:

an inner bracket, said inner bracket having a roll axis about which said inner bracket rotates;

an outer bracket, said outer bracket at least partially surrounding and rotatably engaging said inner bracket;

a camera support structure;

a coupler connecting said outer bracket to said camera support structure;

an inner bracket roll rate sensor; and an inner bracket roll rate controller responsive to the inner bracket roll rate sensor;

wherein said camera support structure is selected from the group consisting of a body-mounted camera stabilization device, a motorized vehicle, a non-motorized mobile apparatus and an immobile apparatus; and wherein said camera support structure is a body-mounted camera stabilization device that comprises a central post having a pan axis, and wherein said outer bracket is coupled to said camera support structure central post by said coupler such that said pan axis of said central post is perpendicular to said roll axis of said inner bracket.

12. A camera stabilization device comprising:

an inner bracket, said inner bracket having a roll axis about which said inner bracket rotates;

an outer bracket, said outer bracket at least partially surrounding and rotatable engaging said inner bracket;

a camera support structure;

a coupler connecting said outer bracket to said camera support structure;

an inner bracket roll rate sensor; and an inner bracket roll rate controller responsive to the inner bracket roll rate sensor;

wherein said camera support structure is selected from the group consisting of a body-mounted camera stabilization device, a motorized vehicle, a non-motorized mobile apparatus and an immobile apparatus; and further comprising a video monitor that displays an image viewed by a camera, said video monitor having a roll axis, said video monitor being rotatably coupled to said support structure central post such that said pan axis of said central post is perpendicular to said roll axis of said video monitor.

13. The camera stabilization device of claim 12 further comprising a video monitor roll rate sensor, and a video monitor roll rate controller responsive to said video monitor roll rate sensor.

14. A camera stabilization device comprising:

an inner bracket, said inner bracket having a roll axis about which said inner bracket rotates;

an outer bracket at least partially surrounding and rotatably engaging said inner bracket;

an inner bracket roll rate sensor;

a video monitor that displays an image viewed by a camera, said video monitor having a roll axis, said video monitor being rotatably coupled to said support structure central post such that said pan axis of said central post is perpendicular to said roll axis of said video monitor;

a video monitor roll rate sensor;

a digital control processor which controls the roll rates of said inner bracket and said video monitor about the respective roll axes thereof, said controller being responsive to said inner bracket and video monitor roll rate sensors;

a body-mounted camera stabilization device comprising a central post having a pan axis; and a coupler which connects said outer bracket to said central post such that said pan axis of said central post is perpendicular to said roll axis of said inner bracket.

15. A stabilized camera comprising a camera and the camera stabilization device of claim 14.

* * * * *